United States Patent [19]

Pflaumer et al.

[11] Patent Number: 5,641,532
[45] Date of Patent: Jun. 24, 1997

[54] BEVERAGES HAVING STABLE FLAVOR/ CLOUD EMULSIONS IN THE PRESENCE OF POLYPHOSPHATE-CONTAINING PRESERVATIVE SYSTEMS BY INCLUDING GELLAN GUM

[75] Inventors: Phillip Floyd Pflaumer, Hamilton; David Lee Montezinos, Fairfield; Paul Ralph Bunke, Cincinnati, all of Ohio

[73] Assignee: The Procter & Gamble Company, Cincinnati, Ohio

[21] Appl. No.: 572,976

[22] Filed: Dec. 15, 1995

[51] Int. Cl.$^6$ .............................. A23L 1/05; A23L 2/44
[52] U.S. Cl. .................. 426/590; 426/330.3; 426/330.5; 426/573; 426/597; 426/599; 426/650; 426/654
[58] Field of Search .................................. 426/590, 599, 426/330.3, 330.5, 573, 597, 650, 654

[56] References Cited

U.S. PATENT DOCUMENTS

| | | | |
|---|---|---|---|
| 3,404,987 | 10/1968 | Kooistra et al. | 99/150 |
| 3,668,132 | 6/1972 | Finder | 252/80 |
| 3,681,091 | 8/1972 | Kohl | 99/150 |
| 4,219,583 | 8/1980 | Igoe | 426/580 |
| 4,220,673 | 9/1980 | Strobel | 426/655 |
| 4,326,052 | 4/1982 | Kang et al. | 536/1 |
| 4,326,053 | 4/1982 | Kang et al. | 536/1 |
| 4,377,636 | 3/1983 | Kang et al. | 435/101 |
| 4,385,123 | 5/1983 | Kang et al. | 435/253 |
| 4,433,000 | 2/1984 | De Leon et al. | 426/599 |
| 4,503,084 | 3/1985 | Baird et al. | 426/573 |
| 4,517,216 | 5/1985 | Shim | 426/573 |
| 4,529,613 | 7/1985 | Mezzino et al. | 426/590 |
| 4,563,366 | 1/1986 | Baird et al. | 426/573 |
| 4,647,470 | 3/1987 | Sanderson et al. | 426/573 |
| 4,705,691 | 11/1987 | Kupper et al. | 426/590 |
| 4,717,579 | 1/1988 | Vietti et al. | 426/597 |
| 4,746,528 | 5/1988 | Prest et al. | 426/573 |
| 4,748,033 | 5/1988 | Syfert et al. | 426/330.3 |
| 4,869,916 | 9/1989 | Clark et al. | 426/573 |
| 4,876,105 | 10/1989 | Wolf et al. | 426/573 |
| 4,906,482 | 3/1990 | Zemel et al. | 426/74 |
| 4,938,983 | 7/1990 | Peignier et al. | 426/573 |
| 4,980,182 | 12/1990 | Kwon et al. | 426/130 |
| 5,021,251 | 6/1991 | McKenna et al. | 426/330.5 |
| 5,190,778 | 3/1993 | Clare et al. | 426/329 |
| 5,196,220 | 3/1993 | Clare et al. | 426/329 |
| 5,376,396 | 12/1994 | Clark | 426/599 |
| 5,417,994 | 5/1995 | Chang et al. | 426/330.5 |
| 5,431,940 | 7/1995 | Calderas et al. | 426/599 |

FOREIGN PATENT DOCUMENTS

| | | | |
|---|---|---|---|
| 63189/86 | 9/1986 | Australia | A61K 47/00 |
| 87130671 | 12/1985 | Japan | A23L 2/00 |
| 8930564 | 7/1987 | Japan | A23L 2/38 |
| 9016941 | 7/1988 | Japan | A23L 1/04 |
| 2018487 | 7/1988 | Japan | A23L 1/05 |
| 3277259 | 3/1990 | Japan | A23L 1/05 |
| 2145159 | 4/1990 | Japan | A23L 1/05 |
| 5003773 | 6/1991 | Japan | A23L 1/0532 |
| 91328032 | 11/1991 | Japan | A61K 31/725 |
| 9297438 | 3/1992 | Japan | A23L 1/05 |

OTHER PUBLICATIONS

Kelco Gel, Gellan Gum, p. 6.
Miscelleous Documents from KelcoGel Gellan Gum a Division of Merck & Co., Inc.
Kang et al.; Xanthan, Gellan, Welan and Rhamsan; *Industrial Gums, Polysaccharides and Their Derivatives;* 3rd Edition; Harcourt Brace Jovanovich, Publishers; 1993; pp. 342–396.
Gibson, Gellan gum; *Thickening and Gelling Agents for Food;* Blackie Academic & Professional; 1992; pp. 227–249.
Baird et al.; Industrial Applications of Some New Microbial Polysaccharides; *Bio/Technology;* Nov. 1983; pp. 778–783.
Sanderson; Gellan gum; *Food Gels;* Elsevier Applied Science; 1990; pp. 201–232.
Crescenzi et al.; Comparative Analysis of the Behavior of Gellan and Welan Gum in Dilute Aqueous Solution; *Carbohydrate Research;* Elsevier Science Publishers; 1986; pp. 425–432.
Tang et al.; Polymer and Ion Concentration Effects on Gellan Gel Strength and Strain; *Journal of Food Sciences;* vol. 59, No. 1; 1994; pp. 216–220.
Yuguchi et al.; Structural Characteristics of Gellan in Aqueous Solution; *Food Hydrocollids;* 1993; vol. 7 No. 5; pp. 373–385.
Ogawa; Osmontic Pressure Measurements for Gellan Gum Aqueous Solutions; *Food Hydrocollids;* 1993; vol. 7, No. 5; pp. 397–405.
Shimazaki et al.; Viscoelastic Properties of Gellan Gum Aqueous Solutions; *Food Hydrocollids;* 1993; vol. 7, No. 5 pp. 417–426.
Nakamura et al.; Viscoelastic Properties of Aqueous Gellan Solutions: The effects of Concentration on Gelation; *Food Hydrocollids;* 1993; vol. 7, No. 5 pp. 417–426.
Moritaka et al.; Effects of Potassium Chloride and Sodium Chloride on the Thermal Properties of Gellan Gum Gels; *Biosci. Biotech. Biochem;* 1992; 56 (4), pp. 595–599.
Campana et al.; On the solution properties of bacterial polysaccharides of the gellan family; *Carbohydrate Research;* 1992; No. 231; pp. 31–38.
Roller et al.; Biotechnology in the Production and Modification of Biopolymers for Foods; *Critical Reviews in Biotechnology;* 1992; No. 12(3); pp. 261–277.

(List continued on next page.)

*Primary Examiner*—Helen Pratt
*Attorney, Agent, or Firm*—Eric W. Guttag; Daniel F. Nesbitt; Jacobus C. Rasser

[57] ABSTRACT

A beverage such as a dilute juice or tea beverage having a stable flavor/cloud emulsion which contains from about 0.005 to about 0.04% gellan gum, from about 100 ppm to about 1000 ppm of a preservative selected from sorbic acid, benzoic acid, alkali metal salts thereof and mixtures thereof, from about 300 ppm to about 3000 ppm of a food grade water soluble polyphosphate, and from about 60 to about 99% by weight of added water having from 0 ppm to about 180 ppm of hardness.

30 Claims, No Drawings

OTHER PUBLICATIONS

Morris; Fermentation–Derived Polysaccharides for Use in Foods; *J. Chem. Technol. Biotechnology;* No. 58; pp. 199–201.

Crescenzi et al.; On the Solution and Gelling Behaviour of Some Bacterial Polysaccharides; *Gazzetta Chemica Italiana;* 117; 1987; pp. 611–616.

Kang et al.; Some Novel Bacterial Polysaccharides of Recent Development; *Kelco Division, Merck & Co., Inc.;* pp. 231–253.

Carroll et al.; Fibre–diffraction studies of the extracellular polysaccharide for *Pseudomonas elodea; Preliminary Communications;* 1992; pp. 1–2.

Clare; Applications of novel biogums; *Chemicals;* Aug. 1989; pp. 238–244.

Moorhouse et al.; PS–60: A New Gel–Forming Polysaccharide; *Amer. Symp. Ser.* 150; 1981; pp. 111–124.

Sanderson et al.; Clear Gels Made with KELCOGEL Gellan Gum and Gelatin; *Research Disclosure;* Jun. 1993; pp. 379–380.

Jansson et al.; Structural studies of gellan gum, an extracellular polysaccharide elaborated by *Pseudomonas elodea; Carbohydrate Research;* 124; 1983; pp. 135–139.

Millane, et al; Frontiers in Carbohydrate Research—1 *Elsevier Applied Science* 1989 pp. 132–163, 14–33, 270–289.

Francis X. Quinn, et al; The Conformational Properties of Gellan Gum Hydrogels *Polymer Gels and Networks* 1 (1993) pp. 93–114.

Vittorio Crescenzi et al; The Influence of side–chains on the dilute–solution properties of three Structurally Related, Bacteria Anionic Polysaccharides *Carbohydrate Research,* 160 (1987) pp. 283–303.

Malcolm A. O'Neill, et al; Structure of the Acidic Extracellular Gelling Polysaccharide Produced by *Pseudomonas elodea Carbohydrate Research,* 124 (1983) pp. 123–193.

Vincent Carroll, et al; Rheology and Microstructure of Solutions of the Microbial Polysaccharide From *Pseudomonas elodea Carbohydrate Research,* 114 (1983) pp. 181–191.

Gellan Gum Receives FDA Approval *Food Technology* (Nov. 1990) pp. 88–90.

Hirohisa Yoshida, et al; Structural Change of Gellan Hydrogel Induced by Annealing; *Food Hydrocolloids* vol. 7 No. 5 (1993) pp. 387–395.

T. Okamoto, et al; Light Scattering Study of Gellan Gum *Food Hydrocolloids* vol. 7 No. 5 (1993) pp. 363–371.

Akihiro Tsutsumi, et al; ESR Studies on Mn(II) Binding to Gellan and Carrageenan Gels *Food Hydrocolloids* vol. 7 No. 5 (1993) pp. 427–434.

M. Watase, et al; Effect of Potassium Ions on the Rheological and Thermal Properties of Gellan Gum Gels *Food Hydrocolloids* vol. 7 No. 5 (1993) pp. 449–456.

Todd A. Talashek, et al; The Influence of Sidechains on the Calculated Dimensions of Three Related Bacterial Polysaccharides *Carbohydrate Research,* 160 (1987) pp. 303–316.

Horace D. Graham; Isolation of Gellan Gum from Foods by Use of Monovalent Cations *Journal of Food Science* vol. 56, No. 5 (1991) pp. 1342–1346.

I.W. Sutherland; The Role of Acylation in Exopolysaccharides Including Those for Food Use *Food Biotechnology* 6(1), (1992) pp. 75–86.

Fermentation Yields A New Gum *Food Engineering* Jan. pp. 52–53.

Toxicology Evaluation of Certain Food Additives and Contaminants *World Health Organization,* Geneva (1991) pp. 288–297.

Rengaswami Chandrasekaran, et al; The Crystal Structure of Gellan *Carbohydrate Research,* 175 (1988) pp. 1–15.

Hans Grasdalen, et al; Gelation of Gellan Gum *Carbohydrate Polymers* 7 (1987) pp. 371–393.

G.R. Chilvers, et al; Coacervation of Gelatin—Gellan Gum Mixtures and Their Use in Microencapsulation *Carbohydrate Polymers* 7 (1987) pp. 111–120.

Mao–Sung Kuo, et al; Identification and Location of L–Glycerate, an Unusual Acyl Substituent in Gellan Gum *Carbohydrate Research,* 156 (1986) pp. 173–187.

Per–Eric–Jansson, et al; Structural Studies of Gellan Gum, an Extracellular Polysaccharide Elaborated by *Pseudomonas elodea Carbohydrate Research,* 124 (1983) pp. 135–139.

R. Chandrasekaran, et al; Chapter 18 A New Generation of Gel–Forming Polysaccharides *American Chemical Society* (1990) pp. 300–314.

V.J. Morris; Biotechnically Produced Carbohydrates with Functional Properties for Use In Food Systems *Food Biotechnology,* 4(1) (1990) pp. 45–57.

Marcia J. Mikolajczak, et al; Sphinganase, a new endoglycanase that cleaves specific members of the Gellan Family of Polysaccharides *Applied and Environmental Microbiology* (Feb. 1994) pp. 402–407.

Evaluation of Certain Food Additives and Contaminants *WHO Technical Report Series 806 World Health Organization,* Geneva (1991) pp. 25–26.

Gibson et al.; Gellan Gum Fluid Gels; *Presented at teh International Food Hydrocollid Conference;* Sep. 6, 1994–Sep. 10, 1994; Columbos, OH.

Bell et al.; Judicious Use of Sequestrants to Optimize KELCOGEL Gellan Gum Performance in Sugar Gels; *Kelco Division of Merck & Co.;* Research Disclosure; May 1994; pp. 2376–237.

BEVERAGES HAVING STABLE FLAVOR/ CLOUD EMULSIONS IN THE PRESENCE OF POLYPHOSPHATE-CONTAINING PRESERVATIVE SYSTEMS BY INCLUDING GELLAN GUM

TECHNICAL FIELD

This application relates to beverages, especially dilute juice and tea beverages, that have stable flavor emulsions and/or cloud emulsions. This application especially relates to dilute juice beverages that have stable flavor emulsions and/or cloud emulsions in the presence of polyphosphate-containing preservative systems.

BACKGROUND OF THE INVENTION

Dilute juice beverages having cloudy or opaque appearance are well known in the art. The cloudy or opaque appearance of these dilute juice products is typically achieved by incorporating a beverage emulsion. Beverage emulsions can be either flavor emulsions (i.e., provide the beverage with flavor and cloudiness) or cloud emulsions (i.e., provide primarily cloudiness). Both types of beverage emulsions comprise an oil phase that is dispersed in a continuous water phase, i.e., they are "oil-in-water" emulsions. This oil phase is typically uniformly dispersed in the continuous water phase in the form of fine droplets that give the beverage its cloudy or opaque appearance.

Beverage emulsions are thermodynamically unstable systems that have a tendency to revert to their original state of two immiscible liquids (i.e., a two phase system). Since the oil is the dispersed phase, it exists as droplets that tend to separate, or "flocculate" by aggregating to form clumps. In the absence of weighting agents, the oil phase, being lighter than the water phase, can separate and rise to the top of the beverage container. This phenomenon is usually referred to as "creaming" and can manifest itself as an unsightly ring inside the neck of the bottle (a condition commonly referred to as "ringing") or as powdery "floc" on the shoulder of the bottle. Conversely, the oil phase can become attached to colloidal particles heavier than the water phase, in which case the oil phase will settle to the bottom of the container. This condition is usually referred to as "sedimentation" because the cloud appears as sediment on the bottom of the bottle.

To enhance the stability of these flavor/cloud emulsions, a thickener or blend of thickeners can be added to the dilute juice beverage. These include propylene glycol alginate, xanthan gum, pectin, starch, modified starch, and carboxymethylcellulose. See U.S. Pat. No. 5,376,396 (Clark), issued Dec. 27, 1994, which discloses beverage stabilizing systems formed from a blend of gellan gum and carboxymethylcellulose that preferably includes propylene glycol alginate. These thickeners essentially stabilize the flavor/cloud emulsion by increasing the relative viscosity of the dilute juice beverage. However, while stabilizing the flavor/cloud emulsion, these thickeners can also undesirably affect the beverage flavor and feel, especially if relatively large quantities of these thickeners are required. Moreover, some of these thickeners, such as xanthan gum, can interact with other beverage components to potentially destabilize the flavor/cloud emulsion or cause undesired flavor effects.

The ability to stabilize flavor/cloud emulsions in dilute juice products can be further complicated by other beverage components typically present in the product. One such component that is desirably present in dilute juice beverages that are intended to be stored without refrigeration (e.g., at ambient temperatures) is an antimicrobial preservative. Dilute juice beverages, when exposed to food spoilage microorganisms, can provide a hospitable environment for rapid microbial growth. Such exposure can, and infrequently does, result from accidental inoculation of the dilute juice beverage during manufacturing or packaging. Food spoilage microorganisms can then rapidly proliferate by feeding on nutrients provided by the juice component of the dilute juice beverage.

Preservatives, such as sorbates, benzoates, organic acids, and combinations thereof have been used in dilute juice beverages to provide some degree of microbial inhibition. At levels effective to inhibit microbial growth, some of these preservatives can contribute off-flavors to dilute juice beverages. Accordingly, it has been recently suggested to include certain food grade polyphosphates (especially sodium hexametaphosphate) to enhance the potency of these preservatives at lower levels in dilute juice beverages. See U.S. Pat. No. 5,431,940 (Calderas), issued Jul. 11, 1995, which discloses the use of polyphosphates, such as sodium hexametaphosphate, in combination with sorbate preservatives, such as potassium sorbate, in dilute juice beverages having relatively low water hardness.

However, it has been found that the presence of polyphosphates, especially sodium hexametaphosphate, can have a destabilizing effect on flavor/cloud emulsions used in dilute juice beverages. While not being bound by theory, it is believed that polymeric materials, including sodium hexametaphosphate, exist in a well hydrated colloid-like state (i.e. each polymer is a separate phase) when mixed with sufficient water. Depending on the concentration of the polymeric material and its compatibility with other components in the beverage, each of these polymers has its own unique tendency to phase separate, thus excluding the droplets of the oil phase from part of the aqueous continuous phase. As the oil droplets are crowded into the remaining available space, the rate at which they, in turn, aggregate and begin to flocculate increases rapidly, causing ring and floc to occur much sooner than would otherwise be the case.

Accordingly, it would be desirable to be able to formulate dilute juice beverages that: (1) have stable flavor/cloud emulsions; (2) can be storm at ambient temperatures through the use of preservative systems that contain polyphosphates, especially sodium hexametaphosphate; (3) have desirable mouthfeel; and (4) do not have undesired flavor effects.

DISCLOSURE OF THE INVENTION

The present invention relates to beverage products, especially dilute juice and tea beverage products, that have stable flavor and/or cloud emulsions. These beverage products comprise:

(a) from about 0.2 to about 5% of an oil-in-water beverage emulsion selected from flavor emulsions and cloud emulsions;

(b) from 0 to about 40% flavor solids selected from fruit juice, tea solids and mixtures thereof;

(c) from about 0.005 to about 0.04% gellan gum;

(d) from about 100 ppm to about 1000 ppm of a preservative selected from sorbic acid, benzoic acid, alkali metal salts thereof and mixtures thereof;

(e) an amount of a water soluble polyphosphate effective to enhance the antimicrobial potency of the preservative;

(f) from about 60 to about 99% by weight of added water having from 0 ppm to about 180 ppm of hardness.

It has been found that gellan gum alone, even at relatively low levels, is extremely effective in stabilizing flavor or cloud emulsions in beverages that additionally contain polyphosphates to enhance the potency of certain preservatives (e.g., potassium sorbate). While other beverage stabilizers such as carboxymethylcellulose and/or propylene glycol alginate can be included along with gellan gum in the beverages of the present invention, the inclusion of these other beverage stabilizers is not required to provide stability to flavor/cloud emulsions. Moreover, it has also been surprisingly found that gellan gum positively interacts with these polyphosphates, i.e., the polyphosphates help to disperse the gellan gum during beverage preparation.

DETAILED DESCRIPTION OF THE INVENTION

A. Definitions

As used herein, "microbial proliferation" means a 100 fold increase or greater in the number of beverage spoilage microorganisms in a dilute juice beverage after an initial contamination level of about 10 cfu/ml.

As used herein, "ambient display time" means the period of time during which a dilute juice beverage at 68° F. (20° C.) can effectively resist microbial proliferation following a 10 cfu/ml contamination with beverage spoilage microorganisms.

As used herein, the term "comprising" means various components can be conjointly employed in the preparation of the beverages of the present invention.

As used herein "noncarbonated beverages" means beverages that contain less than one volume of carbonation.

All weights, parts and percentages used herein are based on weight unless otherwise specified.

B. Beverage Emulsions

The beverages of the present invention comprise from about 0.2 to about 5%, preferably from about 0.5 to about 3%, most preferably from about 0.8 to about 2%, of a beverage emulsion. This beverage emulsion can be either a cloud emulsion or a flavor emulsion.

For cloud emulsions, the clouding agent can comprise one or more fats or oils stabilized as an oil-in-water emulsion using a suitable food grade emulsifier. Any of a variety of fats or oils can be employed as the clouding agent, provided that the fat or oil is suitable for use in foods and beverages. Preferred are those fats and oils that have been refined, bleached and deodorized to remove off-flavors. Especially suitable for use as clouding agents are those fats that are organoleptically neutral. These include fats from the following sources: vegetable fats such as soybean, corn, safflower, sunflower, cottonseed, canola, and rapeseed; nut fats such as coconut, palm, and palm kernel; and synthetic fats. See U.S. Pat. No. 4,705,691 (Kupper, et al), issued Nov. 10, 1987 (herein incorporated by reference) for suitable fat or oil clouding agents.

Any suitable food grade emulsifier can be used that can stabilize the fat or oil clouding agent as an oil-in-water emulsion. Suitable emulsifiers include gum acacia, modified food starches (e.g., alkenylsuccinate modified food starches), anionic polymers derived from cellulose (e.g., carboxymethylcellulose), gum ghatti, modified gum ghatti, xanthan gum, tragacanth gum, guar gum, locust bean gum, pectin, and mixtures thereof. See U.S. Pat. No. 4,705,691 (Kupper, et al), issued Nov. 10, 1987, which is incorporated by reference. Modified starches treated so they contain hydrophobic as well as hydrophilic groups, such as those described in U.S. Pat. No. 2,661,349 (Caldwell et al) (herein incorporated by reference), are preferred emulsifiers for use as herein. Octenyl succinate (OCS) modified starches such as those described in U.S. Pat. No. 3,455,838 (Marotta et al.), and U.S. Pat. No. 4,460,617 (Barndt et al.), (herein incorporated by reference), are especially preferred emulsifiers.

The clouding agent can be combined with a weighting agent to provide a beverage opacifier that imparts a total or partial opaque effect to the dilute juice beverage without separating out and rising to the top. The beverage opacifier provides the appearance to the consumer of a juice-containing beverage. Any suitable weighting oil can be employed in the beverage opacifier. Typical weighting oils include brominated vegetable oil, glycerol ester of wood rosin (ester gum), sucrose acetate isobutyrate (SAIB) and other sucrose esters, gum damar, colophony, gum elemi, or others known to those skilled in the art. Other suitable weighting agents include brominated liquid polyol polyesters that are nondigestible. See U.S. Pat. No. 4,705,690 (Brand et al), issued Nov. 10, 1987, which is incorporated by reference.

The cloud/opacifier emulsion is prepared by mixing the clouding agent with the weighting agent (for opacifier emulsions), the emulsifier and water. The emulsion typically contains from about 0.1 to about 25% clouding agent, from 0 to about 20% weighting oil agent, from about 1 to about 30% emulsifiers, and from about 25 to about 97.9% water, quantum satis.

The particle size of the water-insoluble components of the emulsion is reduced by employing a suitable apparatus known in the art. Because the ability of emulsifying agents to hold oil in suspension is proportional to particle size, emulsions of particles with diameters of from about 0.1 to about 3.0 microns are suitable. Preferably, the particles are about 2.0 microns or less in diameter. Most preferred is an emulsion in which substantially all the particles are 1.0 microns or less in diameter. The particle size is reduced by passing the mixture through an homogenizer, colloid mill or turbine-type agitator. Usually one or two passes is sufficient. See U.S. Pat. No. 4,705,691 (Kupper, et al), issued Nov. 10, 1987, which is incorporated by reference.

Flavor emulsions useful in these beverages comprise one or more suitable flavor oils, extracts, oleoresins, essential oils and the like, known in the art for use as flavorants in beverages. This component can also comprise flavor concentrates such as those derived from concentration of natural products such as fruits. Terpeneless citrus oils and essences can also be used herein. Examples of suitable flavors include fruit flavors such as orange, lemon, lime and the like, cola flavors, tea flavors, coffee flavors, chocolate flavors, dairy flavors, and others. These flavors can be derived from natural sources such as essential oils and extracts, or can be synthetically prepared. The flavor emulsion typically comprises a blend of various flavors and can be employed in the form of an emulsion, alcoholic extract, or spray dried. The flavor emulsion can also include clouding agents, with or without weighting agents, as previously described. See U.S. Pat. No. 4,705,691 (Kupper, et al), issued Nov. 10, 1987, which is incorporated by reference.

Flavor emulsions are typically prepared in the same manner as cloud/opacifier emulsions by mixing flavoring oils (0.001 to 20%) with an emulsifying agent (1 to 30%) and water. (The oil clouding agents can also be present.) Emulsions of particles with diameters of about 0.1 to about 3.0 microns are suitable. Preferably, the particles are about 2.0 microns or less in diameter. Most preferably, the particles are about 1.0 micron or less in diameter. The emulsifying agent coats the particularized flavor oil to aid in preventing coalescence and in maintaining an appropriate dispersion. The viscosity and specific gravity of the flavor emulsion are regulated to be compatible with the finished dilute juice beverage. See U.S. Pat. No. 4,705,691 (Kupper, et al), issued Nov. 10, 1987, which is incorporated by reference.

C. Fruit Juice and Tea Solids

The dilute juice beverages of the present invention optionally but preferably comprise flavor solids selected from fruit juice, tea solids and mixtures of fruit juice and tea solids. When fruit juice is included, the beverages of the present invention can comprise from 0.1 to about 40%, preferably from I to about 20%, more preferably from about 2 to about 10%, most preferably from about 3 to about 6%, fruit juice. (As measured herein, the weight percentage of fruit juice is based on a single strength 2° to 16° Brix fruit juice.) The fruit juice can be incorporated into the beverage as a puree, comminute or as a single strength or concentrated juice. Especially preferred is the incorporation of the fruit juice as a concentrate with a solids content (primarily as sugar solids) of from about 20° to about 80° Brix.

The fruit juice can be any citrus juice, non-citrus juice, or mixture thereof, which are known for use in dilute juice beverages. Examples of such fruit juices include, but are not limited to, non-citrus juices such as apple juice, grape juice, pear juice, nectarine juice, currant juice, raspberry juice, gooseberry juice, blackberry juice, blueberry juice, strawberry juice, custard-apple juice, pomegranate juice, guava juice, kiwi juice, mango juice, papaya juice, watermelon juice, cantaloupe juice, cherry juice, cranberry juice, pineapple juice, peach juice, apricot juice, plum juice and mixtures thereof, and citrus juices such as orange juice, lemon juice, lime juice, grapefruit juice, tangerine juice and mixtures thereof. Other fruit juices, and nonfruit juices such as vegetable or botanical juices, can be used as the juice component of the noncarbonated beverage products of the present invention.

When tea solids are included, the beverages of the present invention can comprise from about 0.02 to about 0.25%, preferably from about 0.7 to about 0.15%, by weight of tea solids. The term "tea solids" as used herein means solids extracted from tea materials including those materials obtained from the genus Camellia including *C. sinensis* and *C. assaimica*, for instance, freshly gathered tea leaves, fresh green tea leaves that are dried immediately after gathering, fresh green tea leaves that have been heat treated before drying to inactivate any enzymes present, unfermented tea, instant green tea and partially fermented tea leaves. Green tea materials are tea leaves, tea plant stems and other plant materials that are related and which have not undergone substantial fermentation to create black teas. Members of the genus Phyllanthus, catechu gambir and Uncaria family of tea plants can also be used. Mixtures of unfermented and partially fermented teas can be used.

Tea solids for use in beverages of the present invention can be obtained by known and conventional tea solid extraction methods. Tea solids so obtained will typically comprise caffeine, theobromine, proteins, amino acids, minerals and carbohydrates. Suitable beverages containing tea solids can be formulated according to U.S. Pat. No. 4,946,701 (Tsai et al), issued Aug. 7, 1990, which is incorporated by reference.

D. Gellan Gum and Other Thickeners

The beverages of the present invention comprise from about 0.005 to about 0.04%, preferably from about 0.01 to about 0.03%, most preferably from about 0.01 to about 0.02%, gellan gum. At these relatively low levels, it is believed that gellan gum does not form elastic gels, but rather, thickens the beverage in a manner similar in character to that of other beverage thickeners such as xanthan gum. Nonetheless, because gellan gum forms a weakly interconnected gel-like molecular network throughout the beverage, it does not readily phase separate. Instead, it keeps other beverage components in position, and does not allow them to phase separate, thus stabilizing these other beverage components, including the flavor/cloud emulsion.

Under extreme circumstances, the flavor/cloud emulsion in the beverage can be inherently highly unstable (e.g., if the emulsion contained no weighting agent and most of the emulsion particles were greater than 10µ in diameter). However, for flavor/cloud emulsions prepared according to the present invention, and where the other beverage components, including the polyphosphate, are present in the beverage within the ranges specified herein, gellan gum tends to dominate in the beverage system and helps to maintain its stability.

Gellan gum is a heteropolysaccharide prepared by fermentation of Pseudomonaselodea ATCC 31461. Gellan gum is available from the Kelco Division of the Monsanto Corp. (previously the Kelco Division of Merck & Co.) under various names, including KELCOGEL, KELCOGEL PC, and KELCOGEL F. Processes for preparing gellan gum are described in U.S. Pat. No. 4,326,052 (Kang et al), issued Apr. 20, 1982; U.S. Pat. No. 4,326,053 (Kang et al), issued Apr. 20, 1982; U.S. Pat. No. 4,377,636 (Kang et al), issued Mar. 22, 1983; and U.S. Pat. No. 4,385,123 (Kang et al), issued May 24, 1983, all of which are incorporated by reference. Suitable gellan gum dispersions typically require the gellan gum to be mixed with water and a sufficient but relatively low concentration of cations. It is believed that this allows the gellan gum molecules to spread out and become properly positioned to form the network referred to above. This is usually accomplished through the addition of sodium citrate (which is present in products like KELCOGEL PC or KELCOGEL F). However, in the beverages of the present invention, the inclusion of the polyphosphate, along with water of appropriately low hardness as described herein, is sufficient so that sodium citrate is not required. Because of the sensitivity of gellan gum (and the structures gellan gum forms in aqueous systems) to the concentration of cations, it is preferred that gellan gum and the polyphosphate be added to water prior to being mixed with other beverage ingredients.

The beverages of the present invention can comprise other thickeners in addition to gellan gum. These other thickeners include carboxymethylcellulose, propylene glycol alginate, xanthan gum, guar gum, pectin, tragacanth gum, gum acacia, locust bean gum, gum arabic, gelatin, as well as mixtures of these thickeners. (As noted above, many of these optional thickeners can also function as emulsifiers for stabilizing the fat/oil clouding agent in the beverage emulsion.) These other thickeners can be included in the beverages of the present invention at levels typically up to about 0.07%, depending on the particular thickener involved and the viscosity effects desired.

E. Polyphosphate-Containing Preservative System

An important aspect of the present invention is to stabilize the beverage emulsion during ambient storage and until the beverage is consumed. However, components in the beverage, such as fruit juice or tea solids, can provide a hospitable environment for rapid microbial growth, especially when stored at ambient temperatures. This necessitates the inclusion of a preservative system to prevent or retard such microbial growth.

Accordingly, the beverages of the present invention comprise from about 100 to about 1000 ppm, preferably from about 200 to about 1000 ppm, and most preferably from about 200 ppm to about 750 ppm, of a preservative selected from sorbic acid, benzoic acid, alkali metal salts thereof and mixtures thereof. The preservative is preferably selected from sorbic acid, potassium sorbate, sodium sorbate and mixtures thereof. Most preferred is potassium sorbate.

The beverages of the present invention further comprise an amount of a food grade water soluble polyphosphate that is effective to enhance the antimicrobial potency of the preservative. What constitutes an "effective amount" of the polyphosphate to enhance the antimicrobial potency of the preservative will depend on a number of factors, including the specific preservative used, the level at which the preservative is present in the beverage, the pH of the beverage, and the level of hardness present in the beverage. It is believed that the polyphosphate enhances the antimicrobial potency of the preservative by sequestering the hardness (i.e., calcium and magnesium ions) present in the beverage. This causes the microbes present in the beverage to lose calcium and magnesium and thus interferes with their ability to protect themselves from the antimicrobial effect of the preservative. Inclusion of the polyphosphate in the beverage at levels of from about 300 to about 3000 ppm, preferably from about 900 to about 3000 ppm, more preferably from about 1000 ppm to about 1500 ppm, has been found to be effective in enhancing the antimicrobial potency of the preservative.

Suitable food grade water soluble polyphosphates for use in the beverages of the present invention typically have the following general formula:

$$(MPO_3)_n$$

where n averages from about 3 to about 100 and each M is independently selected from sodium and potassium atoms, i.e., are alkali metal salts of the polyphosphates. Preferably, n averages from about 13 to about 30 and each M is a sodium atom. Especially preferred are straight chain sodium polyphosphates (i.e., each M is a sodium atom) where n averages from about 13 to about 21, e.g., sodium hexametaphosphate.

The selected preservatives and polyphosphates act synergistically, or at least additively, to inhibit microbiological growth in the beverages of the present invention. This combination is particularly effective in inhibiting yeast, including preservative resistant *Zygosaccharomyces bailii*, and acid tolerant preservative resistant bacteria. Even within the juice concentrations specified for beverages of the present invention (i.e., about 0.1 to about 40%), ambient display times will increase with decreased percentages of juice in the beverage, such that low juice concentrations correlate with ambient display times exceeding about 20 days, while higher juice concentrations tend to correlate with ambient display times of between about 10 and 20 days. Variations in the concentration of preservatives and polyphosphates within the ranges described herein can also impact ambient display times. Nonetheless, so long as the concentration of juice, preservative, polyphosphate, and water hardness (and preferably water alkalinity) are within the ranges recited herein for the beverages, ambient display times will be at least about 10 days.

F. Hardness and Alkalinity

The beverages of the present invention also include water having a relatively low hardness, and preferably of controlled alkalinity. Specifically, the beverages of the present invention comprise from about 60 to about 99% additional water, more typically from about 80 to about 93% water. It is primarily the hardness of this water component that, when used in conjunction with the preservative system described above, provides a greatly improved antimicrobial effect. In addition to hardness, controlling the alkalinity of the added water can provide some improvement in the antimicrobial benefit.

The term "hardness" as used herein refers to the presence of calcium and magnesium cations in water, generally. For purposes of the present invention, hardness of the added water component is calculated according to Association of Official Analytical Chemists (AOAC) standards set forth in *Official Methods of Analysis*, published by the AOAC, Arlington, Va., pp 627–628 (14th ed. 1984), which is incorporated herein by reference. Under AOAC standards, hardness is the sum of $CaCO_3$ equivalents (mg/L) in water, which sum is obtained by multiplying the concentrations (mg/L) found of the following cations in the water by the factors.

TABLE 1

| Cation | Factor |
|--------|--------|
| Ca | 2.497 |
| Mg | 4.116 |
| Sr | 1.142 |
| Fe | 1.792 |
| Al | 5.564 |
| Zn | 1.531 |
| Mn | 1.822 |

Compounds that impart hardness to water are primarily magnesium and calcium carbonates, bicarbonates, sulfates, chlorides and nitrates, although other compounds that can contribute polyvalent cations to water can also impart hardness. Water based on hardness is normally classified as soft (0–60 ppm), moderately hard (61–120 ppm), hard (121–180 ppm) and very hard (over 180 ppm).

The term "alkalinity" as used herein refers to the presence of carbonate and bicarbonate anions in water, generally. For purposes of the present invention, alkalinity of the added water component is measured according to AOAC standards set forth in *Official Methods of Analysis*, published by the AOAC, Arlington, Va., pp 618–619 (14th ed. 1984), which is incorporated herein by reference. The standard AOAC Titrimetric Method for measuring hardness can involve automatic titrators and pH meters, suitably calibrated, or visual titration. Alkalinity is then calculated and expressed as $CaCO_3$ (mg/L) equivalents in the added water component. Compounds that impart alkalinity to water include carbonate, bicarbonate, phosphate, hydroxide and silicate salts of potassium, sodium, calcium and magnesium.

For purposes of the present invention, added water does not include water incidentally included in the beverage by other added materials such as, for example, the fruit juice component. This added water comprises from 0 to about 180 ppm, preferably from 0 ppm to about 60 ppm, and most preferably from 0 to about 30 ppm, of hardness. Excessively hard water can be treated or softened by known and conventional methods to reduce hardness levels to appropriate levels. This treated water can then be used as the added water. A suitable method for softening the added water involves treating the water with $Ca(OH)_2$. This well-known method is most suitable and economical for water having an initial hardness of 100–150 ppm as calcium carbonate. This softening method is not efficient with raw waters with less than about 100 ppm of hardness.

Another suitable method for softening the added water involves ion-exchange operations. This well known method can be used to treat water having an initial hardness of 50–100 ppm. Such ion-exchange operations are in wide application both for the home and industry. Other methods for controlling hardness of the added water can also be used.

The added water preferably comprises from 0 to about 300 ppm, more preferably from 0 ppm to about 60 ppm, of alkalinity. Alkalinity can be adjusted to the preferred level by known or conventional water treatment methods. Suitable methods for adjusting hardness and alkalinity of the added water component are described, for example, by Woodroof and Phillips, Beverages: *Carbonated & Noncarbonated*, AVI Publishing Co., pp 132–151 (rev. ed. 1981), and also by Thomer and Herzberg, *Non-alcoholic Food Service Beverage Handbook*, AVI Publishing Co., pp 229–249 (2nd ed. 1978), both descriptions being incorporated herein by reference.

It is important that the hardness, and preferably the alkalinity, of the added water be within the ranges described above. It has been found that the preservative system described above will not inhibit sufficiently the subsequent proliferation of yeast and acid tolerant preservative resistant bacteria if excessive water hardness is present. However, this same preservative system, when combined with the above recited water quality controls, will inhibit this subsequent microbial proliferation in beverages for up to at least 10 days, typically for at least about 20 days.

G. Acidity

The beverages of the present invention typically have a pH of from about 2.5 to about 4.5, preferably from about 2.7 to about 3.5. This pH range is typical for noncarbonated beverages. Beverage acidity can be adjusted to and maintained within the requisite range by known and conventional methods, e.g., the use of food grade acid buffers. Typically, beverage acidity within the above recited ranges is a balance between maximum acidity for microbial inhibition and optimum acidity for the desired beverage flavor and sourness impression.

H. Sweetener

The beverages of the present invention can, and typically will, contain a sweetener, preferably carbohydrate sweeteners, more preferably mono- and or di-saccharide sugars. Specifically, these beverages will typically comprise from about 0.1 to about 20%, more preferably from about 6 to about 14%, sugar solids. Suitable sweetener sugars include maltose, sucrose, glucose, fructose, invert sugars and mixtures thereof. These sugars can be incorporated into the beverages in solid or liquid form but are typically, and preferably, incorporated as a syrup, more preferably as a concentrated syrup such as high fructose corn syrup. For purposes of preparing beverages of the present invention, these optional sweeteners can be provided to some extent by other components of the beverage such as the fruit juice component, flavorants, and so forth.

Preferred carbohydrate sweeteners for use in these beverages are sucrose, fructose, glucose, and mixtures thereof. Fructose can be obtained or provided as liquid fructose, high fructose corn syrup, dry fructose or fructose syrup, but is preferably provided as high fructose corn syrup. High fructose corn syrup (HFCS) is commercially available as HFCS-42, HFCS-55 and HFCS-90, which comprise 42%, 55% and 90%, respectively, by weight of the sugar solids therein as fructose.

Artificial or noncaloric sweeteners that can optionally be incorporated into these beverages, alone, or in combination with carbohydrate sweeteners, include, for example, saccharin, cyclamates, acetosulfam, L-aspartyl-L-phenylanaine lower alkyl ester sweeteners (e.g., aspartame), L-aspartyl-D-alanine amides disclosed in U.S. Pat. No. 4,411,925 (Brennan et al), L-aspartyl-D-serine amides disclosed in U.S. Pat. No. 4,399,163 (Brennan et al), L-aspartyl-L-1-hydroxymethyl-alkaneamide sweeteners disclosed in U.S. Pat. No. 4,338,346 (Brand), L-aspartyl-1-hydroxyethylakaneamide sweeteners disclosed in U.S. Pat. No. 4,423,029 (Rizzi), L-aspartyl-D-phenylglycine ester and amide sweeteners disclosed in European Patent Application 168,112 (Janusz), published Jan. 15, 1986, and the like. A particularly preferred noncaloric sweetener is aspartame.

I. Other Optional Beverage Ingredients

The beverages of the present invention can comprise other optional beverage ingredients, including flavorants, other preservatives (e.g., organic acids), colorants and so forth. These beverages can also be fortified with from 0 to about 110% of the U.S. Recommended Daily Allowance (RDA) of vitamins and minerals, provided that such vitamins and minerals do not substantially alter the desired properties of the beverage (e.g., ambient display times), and that such vitamins and minerals are chemically and physically compatible with the other essential components of beverage. Especially preferred are vitamin A (e.g., vitamin A palmitate), provitamins thereof (e.g., β-carotene), vitamin B1 (e.g., thamine HCl) and vitamin C (i.e., ascorbic acid), although it is understood that other vitamins and minerals can also be used.

It is well known that certain food grade polyphosphates, such as the polyphosphates described herein, can help inhibit inactivation of ascorbic acid while in the beverage. It is also important to note that calcium, iron and magnesium fortification should be avoided since these polyvalent cations can bind to and inactivate the polyphosphate.

J. Preparation

The beverages of the present invention can be prepared by slight modification of conventional methods for formulating noncarbonated beverages. Methods for making dilute juice beverages, for example, are described in U.S. Pat. No. 4,737,375 (Nakel et al), issued Apr. 12, 1988, which is incorporated herein by reference. Methods for making beverage products applicable to beverages are also described by Woodroof and Phillips, *Beverages: Carbonated & Noncarbonated*, AVI Publishing Co. (rev. ed. 1981); and by Thorner and Herzberg, *Non-alcoholic Food Service Beverage Handbook*, AVI Publishing Co. (2nd ed. 1978). Such conventional methods can include hot packing or aseptic packaging operations, although such operations are not necessary for achieving either beverage stability or extended ambient display times, as described above.

One desirable modification in making dilute juice beverages according to the process of the present invention is to thoroughly disperse the gellan gum in water prior to combining it or adding it to the other beverage components. It is believed that the predispersion of the gellan gum in water allows it to assume the appropriate molecular configuration from which it can rearrange in the final dilute juice beverage to develop viscosity. Another desirable modification according to the process of the present invention is to reduce the temperature of the dilute juice beverage to a temperature of about 60° F. (15.6° C.) or less in about 90 seconds or less after heating, e.g., pasteurization. Typically after final blending of the beverage ingredients, the dilute juice beverage is pasteurized at a temperature of at least about 180° F. (82.2° C.), preferably at least about 186° F. (85.6° C.). Quickly cooling ("shock chilling") the pasteurized dilute juice beverage to about 60° F. (15.6° C.) or less is important for the proper development of viscosity in the beverage in a relatively short period of time. While proper development of viscosity in the beverage can be achieved without "shock chilling," it usually takes a significantly longer period of time to occur, even if the dilute juice beverage has not been heated to higher temperatures required for pasteurization.

One method for preparing the dilute juice beverages according to the process of the present invention involves making a beverage concentrate, adding it to a sugar syrup containing the polyphosphate and gellan gum (with or without other thickeners), and then trimming the mixture with water, sugar syrup, and beverage concentrate to obtain the requisite acidity and material composition. All added water used in such a preparation must have, or be adjusted to, the requisite hardness and, preferably adjusted to the requisite alkalinity levels. In such a method, the beverage concentrate can be prepared by admixing to water (correct alkalinity and hardness) an acidulant (e.g., citric acid), water soluble vitamins, flavorants including juice concentrate, and preservative. An oil-in-water emulsion can then be added to the concentrate. The sugar syrup for use in preparing the beverage is separately prepared by adding the polyphosphate and thickening agents (including the gellan gum) to water, and then adding ascorbic acid and sugar syrup (e.g., high fructose corn syrup) to the mixture. The preservative can then be added to the resulting sugar syrup. The sugar syrup and concentrate are combined to form the beverage. The beverage can be trimmed with small amounts of added water, sugar syrup and beverage concentrate to achieve the requisite acidity and composition of the beverage of the present invention. It can then be pasteurized, packaged and stored such that the temperature of the entire beverage is quickly reduced to about 60° F. (15.6° C.) or less following final blending of the beverage components.

K. Test Method: Ambient Display Times

Ambient display times correspond to the time period during which a noncarbonated beverage product at 68° F. (20° C.) can effectively resist microbial proliferation following a 10 cfu/ml inoculation with beverage spoilage microorganisms. The term "microbial proliferation" as used herein means a 100 fold increase or greater in the number of beverage spoilage microorganisms in a noncarbonated beverage after an initial inoculation level of about 10 cfu/ml.

Ambient display times for beverages can be determined by the following method. Beverages are inoculated with mixed groups of preservative resistant yeast containing at least four separate yeast isolates, including *Zygosaccharomyces bailii*, and with mixed groups of preservative resistant, acid tolerant bacteria, including Acetobacter species. All yeast and bacteria utilized in the inoculation are previously isolated from preserved fruit juice beverages. Inoculated beverage products are maintained at 68° F. (20° C.) for 21 days and aerobic plate cultures performed periodically. Aerobic plate counts of both yeast and bacteria populations are performed as described in the Compendium of Methods for the Microbiological Examinations of Foods, American Public Health Association, Washington, D.C. (edited by C. Vanderzant and D. F. Splittstoesser), which description is incorporated herein by reference. These plate counts are then used to identify the degree of microbial proliferation in the inoculated beverage.

EXAMPLES

The following includes specific embodiments of the dilute juice beverages, and processes for preparing them, according to the present invention.

Example I

A cloud emulsion is prepared using the following ingredient formulation:

| Ingredient | % |
| --- | --- |
| Distilled Water | 84.9 |
| Octenyl Succinate Modified Starch | 7.0 |
| Clouding Agent (cottonseed oil) | 7.0 |
| Vitamin C (ascorbic acid) | 0.05 |
| Artificial Colors | 0.05 |
| Citric acid | 0.75 |
| Potassium sorbate | 0.25 |

The above ingredients are mixed together in the order indicated and homogenized using a Model 110T Microfluidizer (Microfluidics Corp., Newton, Mass.) in a manner that produces a cloud emulstion having an average particle size less than 1 µm in diameter.

A beverage concentrate is then prepared using this cloud emulsion and the following ingredients:

| Ingredient | % |
| --- | --- |
| Distilled Water | 56.648 |
| Citric acid | 7.75 |
| Sodium citrate | 1.4 |
| Vitamin B1 (thiamine HCl) | 0.002 |
| Fruit Juice Concentrate | 13.0 |
| Cloud Emulsion | 21.0 |
| Natural Flavoring | 0.2 |

The above ingredients are mixed together in order indicated. A thickener premix is then prepared by thoroughly dispersing gellan gum (e.g., Kelcogel, Kelcogel F or Kelcogel PC) in distilled water preheated to 100° F. at a ratio of gellan gum to water of 0.1:100. Another premix is then prepared by dispersing sodium hexametaphosphate (SHMP) of average chain length 13 (Monsanto Co., St. Louis, Mo.) in distilled water preheated to 100° F. (37.8° C.) at a ratio of SHMP to water 1:589.5. The thickener and SHMP premixes are then combined at a ratio of 200.1:590.5 to provide a combined thickener/SHMP mixture.

The beverage concentrate and thickener/SHMP mixture are then combined with the following ingredients in the order indicated and refrigerated overnight to provide a finished dilute juice beverage that is stable against flocculation or significant ringing, even if stored under ambient conditions prior to consumption:

| Ingredient | % |
| --- | --- |
| Thickener/SHMP Mixture | 78.91 |
| Vitamin C (ascorbic acid) | 0.04 |
| Sweetener (high fructose corn syrup) | 13.0 |
| Beverage Concentrate | 8.0 |
| Potassium Sorbate | 0.05 |

Example II

A cloud emulsion and beverage concentrate are prepared in the same manner as described in Example I. Gellan gum (Kelcogel), carboxymethylcellulose (CMC) and SHMP are thoroughly mixed in dry form at a ratio of 0.1:0.6:1. This mixture is dispersed in distilled water at room temperature at a ratio of 1.7:200. The beverage concentrate and this Kelcogel/CMC/SHMP mixture are then combined at room temperature with the following ingredients in the order indicated and refrigerated overnight to provided a stable finished dilute juice beverage:

| Ingredient | % |
| --- | --- |
| Distilled Water | 58.71 |
| Kelcogel/CMC/SHMP Mixture | 20.2 |
| Vitamin C (ascorbic acid) | 0.04 |
| Sweetener (high fructose corn syrup) | 13.0 |
| Beverage Concentrate | 8.0 |
| Potassium sorbate | 0.05 |

Example III

A sufficient quantity of the dilute juice beverage described in Example II. is prepared and then passed through a commercial high temperature short time (HTST) pasteurization unit (instead of being refrigerated). In the HTST unit, the beverage is heated to a pasteurizing temperature (about 186° F. (85.6° C.)) for a few seconds, then quickly cooled to 60° F. (15.6° C.) or below. The pasteurized beverage can be bottled and stored without further cooling and will develop appropriate thickness overnight, even when kept at elevated temperature (above ambient, but below 190° F. (87.8° C.)).

What is claimed is:

1. A dilute juice beverage which comprises:
   (a) from about 0.2 to about 5% of an oil-in-water beverage emulsion selected from the group consisting of flavor emulsions and cloud emulsions;
   (b) from 0 to about 40% flavor solids selected from the group consisting of fruit juice, tea solids, and mixtures thereof;
   (c) from about 0.005 to about 0.04% gellan gum;
   (d) from about 100 ppm to about 1000 ppm of a preservative selected from the group consisting of sorbic acid, benzoic acid, alkali metal salts thereof and mixtures thereof;
   (e) an amount of a water soluble polyphosphate effective to enhance the antimicrobial potency of said preservative;
   (f) from about 60 to about 99% by weight of added water having from 0 ppm to about 180 ppm of hardness.

2. The beverage of claim 1 which comprises from about 0.01 to about 0.03% gellan gum.

3. The beverage of claim 1 which comprises from about 300 to about 3000 ppm of said polyphosphate and wherein said polyphosphate has the following general formula:

$(MPO_3)_n$ wherein n averages from about 3 to about 100 and wherein each M is independently selected from sodium and potassium atoms.

4. The beverage of claim 3 wherein n averages from about 13 to about 30 and each M is sodium.

5. The beverage of claim 4 which comprises from about 900 to about 3000 ppm of a sodium polyphosphate wherein n averages from about 13 to about 21 and from about 200 to about 1000 ppm of potassium sorbate.

6. The beverage of claim 1 which comprises from about 1 to about 20% fruit juice.

7. The beverage of claim 6 which comprises from about 2 to about 10% fruit juice.

8. The beverage of claim 1 which comprises from about 0.02 to about 0.25% tea solids.

9. The beverage of claim 8 which comprises from about 0.7 to about 0.15% tea solids.

10. The beverage of claim 1 which comprises from about 0.8 to about 2% of said beverage emulsion.

11. The beverage of claim 1 wherein said added water has from 0 ppm to about 60 ppm of hardness.

12. The beverage of claim 1 which further comprises from about 0.1 to about 20% of a sugar sweetener.

13. The beverage of claim 12 which comprises from about 6 to about 14% of a sugar sweetener.

14. The beverage of claim 1 which has a pH of from about 2.5 to about 4.5.

15. The beverage of claim 14 which has pH of from about 2.7 to about 3.5.

16. A noncarbonated dilute juice beverage which has a pH from about 2.5 to about 4.5 and which comprises:
   (a) from about 0.2 to about 3% of an oil-in-water beverage emulsion selected from the group consisting of flavor emulsions and cloud emulsions;
   (b) from about 1 to about 20% fruit juice;
   (c) from about 0.01 to about 0.03% gellan gum;
   (d) from about 200 ppm to about 1000 ppm of a preservative selected from the group consisting of sorbic acid, benzoic acid, alkali metal salts thereof and mixtures thereof;
   (e) from about 900 ppm to about 3000 ppm of a water soluble polyphosphate having the following general formula:

$(MPO_3)_n$ wherein n averages from about 13 to about 30 and wherein each M is a sodium atom;
   (f) from about 80 to about 99% by weight of added water having from 0 ppm to about 60 ppm of hardness.

17. The beverage of claim 16 which comprises from about 1000 to about 1500 ppm of a sodium polyphosphate where n averages from about 13 to about 21 and from about 200 to about 750 ppm of potassium sorbate.

18. The beverage of claim 16 which comprises from about 0.8 to about 2% of said beverage emulsion.

19. The beverage of claim 16 wherein said added water has from 0 ppm to about 30 ppm of hardness.

20. The beverage of claim 16 which comprises from about 6 to about 14% of a sugar sweetener.

21. The beverage of claim 16 which has pH of from about 2.7 to about 3.5.

22. A process for preparing a pasteurized dilute juice beverage having a stable beverage emulsion, which comprises the steps of:
   (1) forming a dilute juice beverage comprising:
      (a) from about 0.2 to about 5% of an oil-in-water beverage emulsion selected from the group consisting of flavor emulsions and cloud emulsions;
      (b) from about 0.1 to about 40% fruit juice;
      (c) from about 0.005 to about 0.04% gellan gum;
      (d) from about 100 ppm to about 1000 ppm of a preservative selected from the group consisting of sorbic acid, benzoic acid, alkali metal salts thereof and mixtures thereof;

(e) from about 300 ppm to about 3000 ppm of a water soluble polyphosphate;

(f) from about 60 to about 99% by weight of added water having from 0 ppm to about 180 ppm of hardness (2) pasteurizing the dilute juice beverage at a temperature of at least about 180° F. (82.2° C.);

(3) cooling the pasteurized dilute juice beverage to about 60° F. (15.6° C.) or less in about 90 seconds or less.

23. The process of claim 22 wherein the dilute juice beverage is pasteurized at a temperature of at least about 186° F. (85.6° C.).

24. The process of claim 22 where the gellan gum is throughly dispersed in water prior to step (1).

25. The process of claim 22 wherein the dilute juice beverage comprises from about 0.01 to about 0.03% gellan gum.

26. The process of claim 25 wherein the polyphosphate has the following general formula:

$$(MPO_3)_n$$

wherein n averages from about 3 to about 100 and wherein each M is independently selected from sodium and potassium atoms.

27. The process of claim 26 wherein n averages from about 13 to about 30 and each M is sodium.

28. The process of claim 27 wherein the dilute juice beverage comprises from about 900 to about 3000 ppm of a sodium polyphosphate where n averages from about 13 to about 21 and from about 200 to about 1000 ppm of potassium sorbate.

29. The process of claim 27 wherein the dilute juice beverage comprises from about 1 to about 20% fruit juice.

30. The process of claim 29 wherein the dilute juice beverage comprises from about 3 to about 6% fruit juice.

* * * * *